US008649562B2

(12) United States Patent
De Haan et al.

(10) Patent No.: US 8,649,562 B2
(45) Date of Patent: *Feb. 11, 2014

(54) METHOD AND SYSTEM FOR PROCESSING A SIGNAL INCLUDING AT LEAST A COMPONENT REPRESENTATIVE OF A PERIODIC PHENOMENON IN A LIVING BEING

(75) Inventors: Gerard De Haan, Eindhoven (NL); Ihor Olehovych Kirenko, Eindhoven (NL); Adriaan Johan Van Leest, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 9 days.

This patent is subject to a terminal disclaimer.

(21) Appl. No.: 13/500,172

(22) PCT Filed: Oct. 5, 2010

(86) PCT No.: PCT/IB2010/054491
§ 371 (c)(1),
(2), (4) Date: Apr. 4, 2012

(87) PCT Pub. No.: WO2011/042858
PCT Pub. Date: Apr. 14, 2011

(65) Prior Publication Data
US 2012/0195473 A1 Aug. 2, 2012

(30) Foreign Application Priority Data
Oct. 6, 2009 (EP) ...................................... 09172329

(51) Int. Cl.
*G06K 9/00* (2006.01)

(52) U.S. Cl.
USPC ........................... 382/103; 382/107; 382/128

(58) Field of Classification Search
None
See application file for complete search history.

(56) References Cited

U.S. PATENT DOCUMENTS

| 5,431,170 A | 7/1995 | Mathews |
| 2006/0089574 A1* | 4/2006 | Paradis ........................... 601/41 |
| 2006/0235295 A1 | 10/2006 | Boese et al. |

OTHER PUBLICATIONS

Viola et al: "Robust Real-Time Object Detection"; Proceedings of IEEE Second International Workshop on Statistical and Computational Theories of Vision-Modeling, Learning, Computing, and Sampling, Vancouver, Canada, Jul. 2001, 25 Page Article.

(Continued)

*Primary Examiner* — Bhavesh Mehta
*Assistant Examiner* — Siamak Harandi

(57) ABSTRACT

A method of processing a signal including at least a component representative of a periodic phenomenon in a living being includes obtaining a sequence of images showing the living being, extracting at least one first signal having at least a component representative of a periodic phenomenon in a living being from the sequence of images using remote plethysmography. Separate data representative of at least a periodic component of motion of the living being are obtained by carrying out motion analysis of the sequence of images. The data are used at least to suppress a component of the first signal corresponding to the periodic component of motion of the living being. The method is unobtrusive to the living being, and the living being can be in motion.

18 Claims, 8 Drawing Sheets

(56) References Cited

OTHER PUBLICATIONS

Ang et al: "Zero Phase Filtering for Active Compensation of Periodic Physiological Motion"; IEEE First RAS-EMBS International Conference on Biomedical Robotics and Biomechatronics, Feb. 2006, pp. 182-187.

Verkruysse et al: "Remote Plethysmographic Imaging Using Ambient Light"; Optics Express, vol. 16, No. 26, Dec. 2008, pp. 21434-21445.

Viola et al: "Robust Real-Time Face Detection"; International Journal of Computer Vision, vol. 57, No. 2, 2004, pp. 137-154.

De Haan et al: "True-Motion Estimation With 3-D Recursive Search Block Matching"; IEEE Transactions on Circuits and Systems for Video Technology, vol. 3, No. 5, Oct. 1993, No. 368-379.

Han et al: "Development of Real-Time Motion Artifact Reduction Algorithm for a Wearable Photoplethysmography"; Proceedings of the 29th Annual International Conference of the IEEE EMBS, Aug. 2007, pp. 1538-1541.

Ortmaier et al: "Motion Estimation in Beating Heart Surgery"; IEEE Transactions on Biomedical Engineering, Oct. 2005, vol. 52, No. 10, pp. 1729-1740.

\* cited by examiner

METHOD AND SYSTEM FOR PROCESSING A SIGNAL INCLUDING AT LEAST A COMPONENT REPRESENTATIVE OF A PERIODIC PHENOMENON IN A LIVING BEING

FIELD OF THE INVENTION

The invention relates to a method and system for processing a signal including at least a component representative of a periodic phenomenon in a living being. The invention also relates to a computer program.

BACKGROUND OF THE INVENTION

U.S. Pat. No. 5,431,170 discloses a pulse rate meter comprising a sensor unit attached to a headband so that the sensor unit is applied against the forehead when the headband is being worn. The sensor unit comprises two light emitters and light sensors for receiving light from the respective emitters after reflection within the forehead body tissue. One emitter emits infra-red light, and the electrical signal provided by the sensor receiving light from this emitter will vary in accordance with the pulsations in the blood flow through the blood vessels in the forehead. The other emitter emits light of a different and preferably substantially shorter wavelength, e.g. yellow light, such that the signal from its sensor is relatively independent of variations due to the flow pulsations. Both signals do, however, vary in accordance with vibrations of the forehead due to movements. A noise cancellation circuit may carry out a frequency analysis of the output signals from the respective sensors: peaks at corresponding frequencies or frequency ranges in the two signals are regarded as noise and the remaining frequency in the signal from the infra red sensor represents the pulse rate.

A problem of the known system is that it is relatively obtrusive and only able to compensate for motion of one particular body part, namely that to which the sensor unit is attached. Movement of e.g. the arms would affect blood flow, but would not be picked up by the combination of emitter and receiver operating at the shorter wavelength, whereas it would make it more difficult to detect blood flow variations due to respiration or beating of the heart.

SUMMARY OF THE INVENTION

It is desirable to provide a method, system and computer program of the types mentioned above that enable the provision of a relatively clean signal including at least a component representative of a periodic phenomenon in a living being for analysis to quantify the periodic phenomenon and that are able to compensate with a wide range of types of motion.

To this end, according to an aspect of the invention, there is provided a method of processing a signal including at least a component representative of a periodic phenomenon in a living being, including:

obtaining at least one first signal having at least a component representative of a periodic phenomenon in a living being;

obtaining separate data representative of at least a periodic component of motion of the living being, by obtaining a sequence of images showing the living being, synchronized with the at least one first signal, and carrying out video-based motion analysis of the sequence of images; and using the data at least to suppress a component of the first signal corresponding to the periodic component of motion of the living being.

By obtaining a sequence of images showing the living being, synchronized with the at least one first signal, and carrying out video-based motion analysis of the sequence of images, a large range of types of motion can be quantified in an unobtrusive and relatively efficient manner. As long as a large part of the living being is represented in the sequence of images, even localized motion can be detected (e.g. movement of only the arms or legs). This can be done with a single video camera, rather than a multitude of sensors. Sensors attached to the body are also avoided. Compared to other types of remote sensing, movement in many different directions can be detected, in particular movement towards and away from the camera as well as movement parallel to the image plane. It is observed that obtaining separate data representative of at least a periodic component of motion of the living being is also of benefit where the first signal is extracted from the sequence of image using image analysis involving alignment of images or Regions Of Interest (ROIs) in the images. Such alignment is not always robust to image artefacts introduced indirectly due to motion, e.g. shadows. Thus, even in such a situation, obtaining separate data representative of at least a periodic component of motion of the living being and using the data at least to suppress a component of the first signal corresponding to the periodic component of motion of the living being would improve the quality of the first signal.

Preferred embodiments of the invention are defined in the dependent claims. It shall be understood that the claimed system and the claimed computer program have similar and/or identical preferred embodiments as the claimed method and as defined in the dependent claims.

In an embodiment, obtaining the at least one first signal includes extracting at least one first signal from the sequence of images.

This embodiment is relatively efficient, since it can be implemented using only one sensor in the form of a camera for taking a series of digital images. In that case, the problem of synchronization of the first signal with the separate data representative of at least a periodic component of motion becomes trivial. Thus, the step of using the data to at least suppress a component of the first signal corresponding to the periodic component of motion of the living being also becomes easier to implement.

In a variant, extracting the at least one first signal from the sequence of images includes obtaining values of a variable corresponding to a combination of pixel values from a respective image.

By combining pixel values, very small variations in color and/or brightness can be detected. Random noise is removed by the combination step, which will generally include a summation operation, possibly in the form of a weighted sum. Thus, a form of remote photoplethysmography can be provided with this embodiment.

In a further variant, extracting the at least one first signal from the sequence includes determining only variations in the variable over the sequence.

This variant is based on the recognition that only variations in brightness or color are of interest when characterizing periodic biological phenomena.

According to the invention, unobtrusive vital sign (e.g. heart/respiratory-rate) monitoring using a video camera, or remote photoplethysmography, is enabled. In an embodiment, the algorithm tracks the average skin-tone of a person, which varies with the blood volume and blood oxygenation. The method, however, is sensitive to motion, local variations in skin-tone, and illumination level/spectrum changes which renders it less suitable for commercially viable applications.

The sensitivity to motion makes the unobtrusive vital sign monitoring particularly less suitable for applications for which the individual want to move freely. A good example for such a case is heartbeat monitoring in fitness applications.

Hence, according to preferred embodiments it is proposed to suppress the unwanted component in the average skin-tone signal due to motion. This is in particular important when the motion is periodic and the frequency of the motion falls within the frequency range of interest, say, between 40 beats per minute (BPM) and 210 BPM. In this case, it is difficult to distinguish the heartbeat signal from the motion signal and removal of this unwanted component is very important for stable heart rate estimation. However, the method is not restricted to periodic motion only.

Accordingly, an embodiment of the method includes calculating at least one motion vector for at least one subject represented in the images and analyzing a repetitiveness of motion vector values.

This embodiment allows one to separate out information concerning only certain types of periodic motion, e.g. of a certain magnitude. It is also useful for distinguishing between multiple living beings represented in the sequence of images.

A variant includes calculating motion vector values for each of a plurality of parts of a subject represented in the images.

This variant is useful where multiple signals having at least a component representative of a periodic phenomenon in a living being are obtained, since the appropriate correction signal for each of those signals can be formed. Moreover, it is possible to correct each of those signals separately before combining them into one signal representative of a periodic phenomenon in a living being if it is determined that the motion of the plurality of parts is different by more than a certain amount. On the other hand, if the difference is smaller, then the signals having at least a component representative of a periodic phenomenon in a living being can be combined, and the combination can be corrected by suppressing a component corresponding to the periodic component of motion of the living being. This is a relatively efficient embodiment of the method.

In an embodiment, obtaining separate data representative of at least a periodic component of motion includes quantifying spatial displacements of at least part of the living being.

This embodiment has the effect that it is possible to suppress components of the first signal representative of only certain types of periodic motion, e.g. large-scale displacements.

Further embodiments of the proposed method are based on adaptive echo cancellation. It has been found that the motion vectors describing the motion of the skin region of interest in time, is a very clean signal. Moreover, the motion vectors do not contain any heartbeat signal, and are therefore very suitable to use as reference signals for an adaptive filter. It turns out, that generally only a very small number of coefficients is required to reduce the motion artefacts considerably. As a direct result of removing the motion artefacts from the signal is that a much cleaner heartbeat signal can be obtained, which enables the estimation of the heart rate in an alternative way in the time domain by peak-to-peak detection. An additional advantage of a clean signal is that the HRV (heart rate variability) can be estimated.

Accordingly, an embodiment of the method comprises the steps of calculating at least one motion vector for at least one subject represented in the images, filtering said at least one motion vector, and subtracting the filtered motion vector from said first signal to suppress a component of the first signal corresponding to the periodic component of motion of the living being and to obtain a disturbance reduced first signal. Preferably, said filtering comprises adaptive filtering, wherein the coefficients of said filtering are adaptively updated, Preferably, a normalization, in particular a least-mean-square (NLMS) algorithm, is applied. The NLMS algorithm is a special case of the LMS algorithm. This normalization is applied to the motion signal (reference signal) and therefore indirectly to the coefficients updates. Moreover, for a system for which the energy of the motion vectors is approximately known, there is no need to use an NLMS algorithm necessarily, but it is possible to take this energy into account while updating the coefficients.

The coefficients of said filtering are preferably updated such that the energy of the disturbance reduced first signal (i.e. the first signal minus the filtered motion) is minimized.

In a preferred embodiment, at least two motion vectors, in particular in a first direction (e.g. horizontal direction or x-direction) and a second direction (e.g. vertical direction or y-direction) perpendicular to the first direction, are separately calculated and separately filtered.

According to another aspect of the invention, there is provided a system for processing a signal including at least a component representative of a periodic phenomenon in a living being, including:

at least one component for obtaining at least one first signal having at least a component representative of a periodic phenomenon in a living being;

at least one component for obtaining separate data representative of at least a periodic component of motion of the living being, the component including an interface for obtaining a sequence of images showing the living being, synchronized with the at least one first signal, and an image data processing system for carrying out video-based motion analysis of the sequence of images; and at least one data processing component configured to use the data to at least suppress a component of the first signal corresponding to the periodic component of motion of the living being.

In an embodiment, the system is configured to execute a method according to the invention.

According to another aspect of the invention, there is provided a computer program including a set of instructions capable, when incorporated in a machine-readable medium, of causing a system having information processing capability to execute a method according to the invention.

BRIEF DESCRIPTION OF THE DRAWINGS

The invention will be explained in further detail with reference to the accompanying drawings, in which.

DETAILED DESCRIPTION OF THE EMBODIMENTS

Several embodiments of a system suitable for carrying out remote photoplethysmography (PPG) will be explained herein. Photoplethysmography is a method for characterizing certain periodic physiological phenomena using skin reflectance variations. The human skin can be modeled as an object with at least two layers, one of those being the epidermis (a thin surface layer) and the other the dermis (a thicker layer underneath the epidermis). Approximately 5% of an incoming ray of light is reflected in the epidermis, which is the case for all wavelengths and skin colors. The remaining light is scattered and absorbed within the two skin layers in a phenomenon known as body reflectance (described in the Dichromatic Reflection Model). The epidermis behaves like an optical filter, mainly absorbing light. The light is transmitted depending on its wavelength and the melanin concentration in the epidermis. In the dermis, light is both scattered and absorbed. The absorption is dependent on the blood composition, i.e. the content of blood and its ingredients such as haemoglobin, bilirubin, and beta-carotene, so that the absorption is sensitive to blood flow variations. The optical properties of the dermis are generally the same for all human races. The dermis contains a dense network of blood vessels, about 10% of an adult's total vessel network. These vessels contract according of the blood flow in the body. They consequently change the structures of the dermis, which influences the reflectance of the skin layers. Consequently, the heart rate can be determined from skin reflectance variations.

The system and methods to be described are not limited to photoplethysmograpy, but can also be used in other situations in which a signal representative of a periodic phenomenon of interest is captured and is to be corrected for motion. In the case of photoplethysmography, the methods described herein are robust to motion artifacts and changes in illumination that are unrelated to the periodic phenomenon of interest (pulsating blood flow in the case of photoplethysmography)

Figure 1:
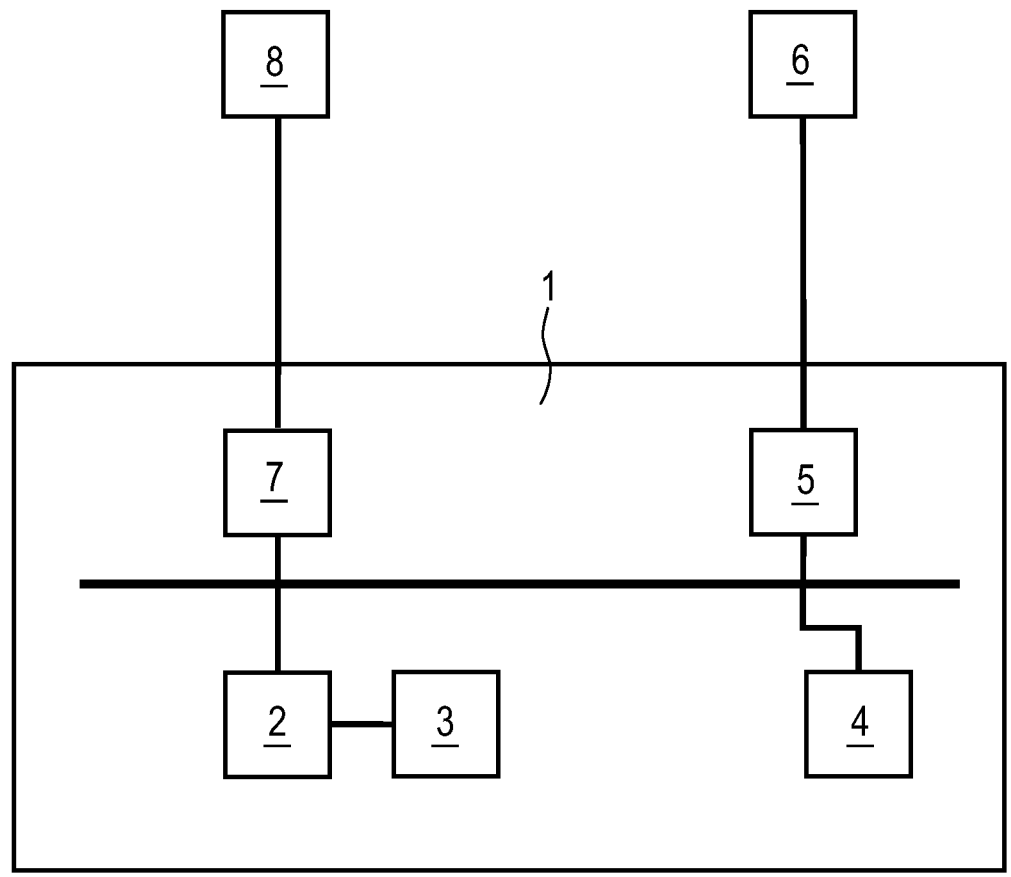
FIG. 1 is a schematic block diagram of a system for forming a time-varying signal including at least a component representative of a periodic phenomenon in a living being.

The system comprises a number of components, of which only a few are illustrated in FIG. 1. The system includes a data processing system 1, which may be a general-purpose computer or a purpose-built computing device for a specific application, and comprises a data processing unit 2 and main memory 3. It further includes a mass-storage device 4 for storing software, including software for carrying out the methods outlined herein. The data processing system 1 has an interface 5 to a video camera 6 for obtaining sequences of digital images. It also has an interface 7 to an output device 8, e.g. a visual display unit, for rendering output in a perceptible form. Of course, the data processing system 1 further includes common functional components such as user input devices, network interfaces, etc., which are not shown separately in FIG. 1.

In an embodiment, (not shown), the data processing system 1 further includes an interface to at least one light source, which can be a light source tuned to a particular range of the visible or near-infrared part of the spectrum of electromagnetic radiation.

The data processing system 1 is arranged to generate a first signal representative of at least variations in a value based on pixel values from each of a sequence of images captured by the video camera 6. It is further arranged to process the first signal in order to suppress or remove motion determined by separate analysis of the captured images.

In a first embodiment (FIG. 2), the method carried out by the data processing system 1 includes obtaining (step 9) a sequence of images. At least one of the images is segmented (step 10), and one or more regions of interest are selected (step 11).

The segmentation and selection steps 10,11 are carried out in order to identify areas representing surfaces of a certain type, in particular those meeting certain criteria. In one embodiment, regions of interest representing some or all of the faces of persons represented in the images are identified. A suitable algorithm for implementing this embodiment is described in Viola, P. and Jones, M. J., "Robust real-time object detection", *Proc. of IEEE workshop on statistical and computational theories of vision,* 13 Jul. 2001. Other suitable algorithms for recognizing image segments with certain shapes, colors and/or patterns are known, and can be used instead of or in combination with this algorithm.

The present description will proceed on the assumption that one region of interest is selected. This region of interest is tracked throughout the sequence of images. A suitable algorithm for doing this is described in De Haan et al., "True-motion estimation with 3-D recursive search block matching", *IEEE transactions on circuits and systems for video technology,* 3 (5), October 1993, pp. 368-379.

For a first pair of images in the sequence, the data processing system 1 proceeds to select from within the region of interest sub-sets of at least one pixel value. In particular, multiple sub-sets are selected from the region of interest in a first image (step 12). For each selected sub-set, a corresponding sub-set is found (step 13) in the adjacent image in the sub-sequence (generally the one following the current image, but it may be the preceding image).

Generally, each sub-set will have a plurality of pixel values, so that the step 13 of finding a corresponding sub-set in the further image includes a search for a similar sub-set according to some criterion. That is to say that the best-matching sub-set within the region of interest in the next image is found. Each selected sub-set from the first image and best-matching sub-set from the next image form a group of sub-sets. Because the sub-sets from the first image are all different from each other, for any pair of groups, the sub-sets from both the first and the next image are different.

Finding the corresponding sub-set in the next frame can include a global search for a combined set of sub-sets corresponding to the set of selected sub-sets from a first image in a next image. This is a low-cost solution, but is likely to be relatively inaccurate. Alternatively, an exhaustive search can be carried out for each sub-set of pixel values selected from a first image. This is a relatively accurate method, but computationally relatively expensive. In another embodiment, a similar sub-set is found by obtaining a predicted motion vector for that sub-set and modifying the predicted motion vector to select candidate sub-sets for evaluation against at least one similarity criterion. The modification is in the form of update vectors, which may be random. Such an approach represents a predictive search, which can be iterated several times over the sub-sets in the current image. Due to the fact that the motion vectors are found individually for each sub-set selected in the initial step 12, the sub-sets in a group match relatively well. The use of a predicted motion vector allows for an implementation with a relatively low computational cost. The predicted motion vector can be obtained by carrying out an exhaustive search for a first of the sub-sets selected in the current frame, and then using the resultant motion vector as the predicted motion vector for the other sub-sets, for example.

Next (step 14), each group is analyzed. Those groups not meeting at least one pre-determined criterion are discarded (step 15) In one embodiment, the at least one criterion is a relative criterion, in the sense that the best-matching group or groups are selected. Generally, however, the at least one criterion will be an absolute criterion, because the number of groups formed will be very large, so that there will always be a few that meet the at least one criterion.

In a particular embodiment, the at least one criterion includes a criterion that each sub-set of pixel values should have a minimum spatial uniformity. In another embodiment, the at least one criterion includes at least one similarity criterion. The similarity criterion can relate to a similarity of color and/or texture, for example. In an embodiment, a motion criterion is used, in the sense that connected pixels may not move more than a certain distance from image to image. Each of these criteria is designed to ensure a robustness to motion and/or illumination changes that are unrelated to the phenomenon of interest (the periodic biological phenomenon in the case of photoplethysmography).

Then, signal segments are built (step 16) for each of only the selected groups of sub-sets. In an embodiment, pixel values from within a sub-set are combined into a single value, e.g. by taking a weighted average or by finding the mean value. This is done for each of the sub-sets in the group, so that there is one such value per image. An effect is that the robustness to noise is relatively high. Other ways of extracting a signal value are possible, however. In an embodiment, the sequence of images comprises two or more sequences of image frames, each corresponding to a different channel and comprised of pixel values representing intensities of electromagnetic radiation captured in a limited range of the spectrum of electromagnetic radiation. For example, the sequence of images can comprise sequences of image frame in different color channels (e.g. Red, Green and Blue). In this alternative, the combination can involve taking a weighted sum of pixel values from each image frame forming a complete image. It can also involve a subtraction operation, e.g. a subtraction of the mean luminance across all channels from the pixel values in a channel corresponding to green light.

Then, the difference between the values associated with the respective sub-sets of a group is taken. The signal segment in an embodiment in which each group includes only sub-sets from two images thus comprises only one value. It is noted that the selection step 15 can be deferred until after the signal segments have been built, in particular in order to use a selection criterion based on the combination of values or on the difference in the combination between images. Thus, only those groups resulting in strong signal values can be selected.

The steps 12-16 are repeated for each next pair of images, so that different signal segments representing different time intervals on a time base defined by the sequence of images are obtained.

These are fused (step 17) in a final step to obtain a signal covering a time interval corresponding to the time interval covered by the sequence of images. Various methods can be used for fusion of the signal segments. The fusion can be based on finding the highest correlation between signals or on illumination of outliers, for example. Optionally, the signal sections can participate in the fusion process with different weightings determining an extent to which they affect the time-varying signal that is the outcome of the fusion step 17. For instance, the weighting value can depend on the reliability with which the sub-sets in a group are determined to match in the step 13 of finding similar sub-sets. In another embodiment, the spatial distance between sub-sets in a group at least partly determines the weighting. If the distance is large, the weight will be lower.

Figure 2:
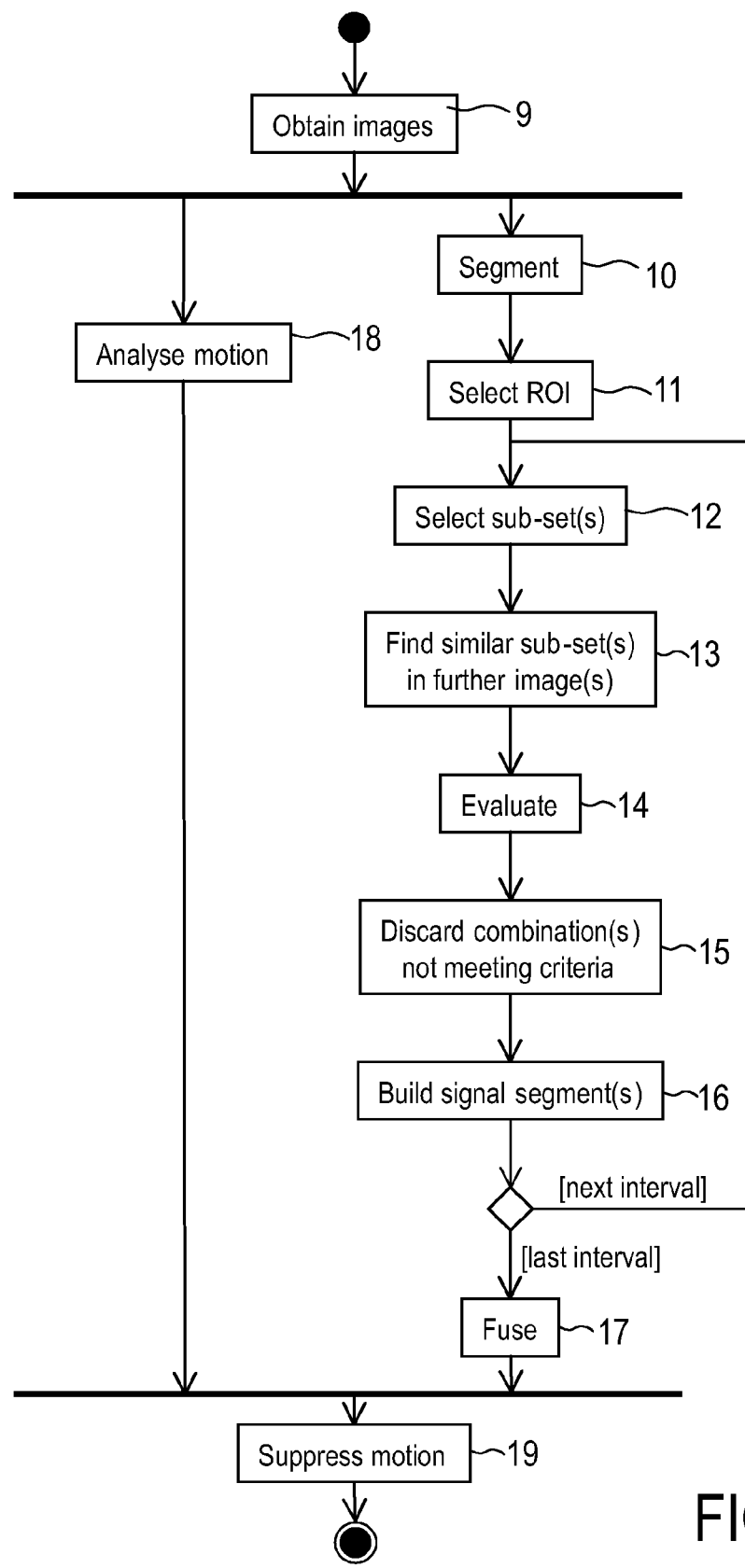
FIG. 2 is a flow chart illustrating a first general embodiment of a method of forming the time-varying signal.

Although the method of FIG. 2 has been explained using the example of groups of pairs of sub-sets from adjacent sub-sets, the method of FIG. 2 can make use of groups of three or more sub-sets from consecutive images of the sequence. The intervals defined by the groups can overlap. For example, one group can comprise sub-sets from the first to third images and another from the second to fourth images.

In yet another alternative embodiment, certain groups are not formed from sub-sets from adjacent images, but by skipping certain images. For example, in one implementation, sub-sets are selected from a first image and the most similar sub-sets in a second image are found, so that pairs of sub-sets from the first and second images are obtained. If a particular pair does not meet a certain criterion, then that pair is discarded, and a similar sub-set from the third image is determined. Interpolation can then be used to form a pair of sub-sets from which a signal section is extracted, for example. Thus, in this embodiment, following the step 15 of discarding pairs of sub-sets of pixel values that do not meet a set of at least one criterion, the step 13 of finding similar sub-sets in further images is repeated on an image further removed from the current image in the sequence of images.

FIG. 2 shows steps comprised in an extra correction to increase the robustness to movement. In a parallel step 18, a measure of motion of at least part of at least one subject represented in the sequence of images is determined, in order to obtain a separate signal representative of at least periodic motion of at least a certain type of a subject represented in the sequence of images. This information is then used to suppress (step 19) a component of the signal obtained as a result of the fusion process. It will be appreciated that the motion of only the subject corresponding to the region of interest is analyzed.

Motion analysis can be accomplished by determining a sequence of motion vectors representative of motion of the region of interest over the sequence of images. The data representative of the periodic component of motion of the living being is then determined by analyzing the repetitiveness of the motion vectors. In an embodiment, only motion within a certain range of amplitudes is taken into account.

As an alternative to using motion vectors, illumination changes in a pixel value or set of pixel values can be used to infer motion. However, this is less reliable, and the frequency of the motion cannot be determined very well.

In an alternative embodiment, there are multiple regions of interest, which may be partially overlapping, each representing parts of a single subject represented in the sequence of images. A signal representative of at least variations in a value based on pixel values is determined for each region of interest in the manner illustrated in FIG. 2. Similarly, the motion of each region of interest is analyzed separately. A determination is then made of whether the motion of the various regions of interest differs by less than a certain value. If that is the case, then the signals representative of at least variation in a value based on pixel values are further fused into one signal. A single motion signal based on the motion signals associated with the regions of interest is also formed. This single motion signal is used to suppress a component of the signal obtained by further fusing the signals representative of at least variation in a value based on pixel values. On the other hand, if the motion signals associated with the different regions of interest differ by more than a certain amount, then the signals representative of at least variations in a value based on pixel values are corrected individually, using the motion signal associated with the associated region of interest. Then, the corrected signals representative of at least variation in a value based on pixel values are further fused into one signal.

Motion suppression can be carried out in the time or in the frequency domain. In one embodiment, wavelet analysis of both the motion signal and the signal in which a periodic component corresponding to a periodic component of motion is to be suppressed is carried out.

It is observed that any of the signal that is the result of the fusion step 17, the signal that is the result of the motion suppression step 19 and the signal segments obtained (step 16) for various intervals can, and generally will, undergo further processing, which may include a step of extracting information corresponding to the biometrical signal of interest, e.g. filtering using an alpha trend mean filter. A further possible filtering operation is band-pass filtering.

The resultant signal can be analyzed, e.g. to obtain a value of the frequency of the periodic phenomenon of interest, corresponding e.g. to the heart rate or respiration rate. It can also be used to gate an imaging apparatus (a CT scanner, for example).

An alternative method (FIG. 3) of forming a time-varying signal representative of at least variations in a value based on pixel values from a sequence of images leaves out the step 13 of finding similar sub-sets in two or more images to form a group of sub-sets of pixel values. Instead, groups of sub-sets corresponding in position are formed.

Figure 4:
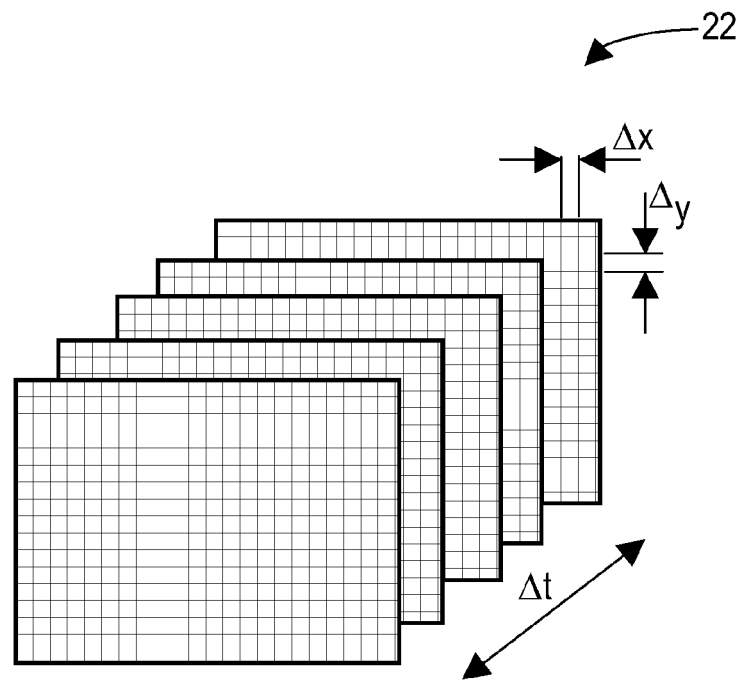
FIG. 4 is an illustration of groups of sub-sets of pixel values obtained from images covering a limited interval of a sequence of images.

The method makes use of a buffer of a certain number of images, to which a most recent image is added (step 20), and from which a less recent image is removed with each iteration of the method. Thus, the buffer contains a sub-sequence of a sequence of images. These are used to compose spatio-temporal volumes (step 21) by laying a grid (FIG. 4) over each of a set 22 of images. The images in the set 22 are at least based on the images provided by the video camera 6. They may be the result of filtering and/or image processing operations (not shown) to compensate for motion, camera movement and the like.

Figure 5:
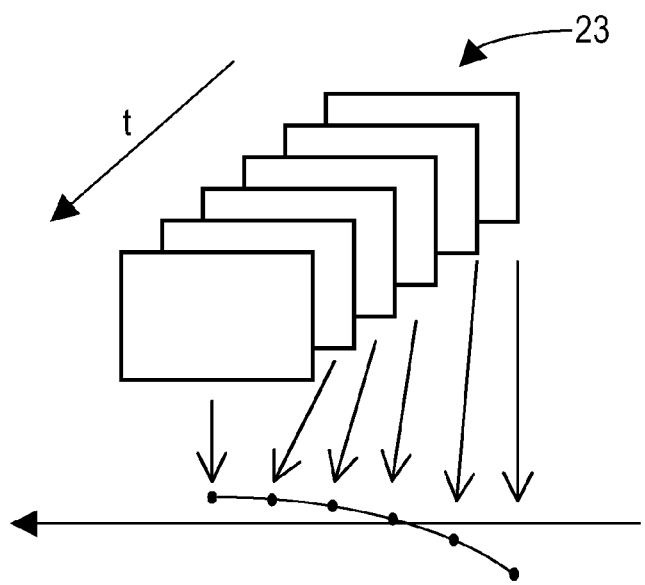
FIG. 5 is an illustration of an extraction of a signal section from a selected group of sub-sets of pixel values.

The grid defines a spatial aperture with a width $\Delta x$ and a height $\Delta y$. Each spatio-temporal volume consists of the pixel values within a given one of the apertures of each of the images in the set 22. An example of a sequence 23 of sub-sets of pixel values corresponding to the pixel values within a spatial aperture is shown in FIG. 5. The number of images in the set 22 determines a time interval $\Delta t$.

The sub-sets of pixel values within each spatio-temporal volume are evaluated (step 24) against a set of at least one criterion. Only those that meet the at least one criterion are kept, and used to obtain a signal including at least a component representative of a periodic phenomenon in a living being.

Figure 3:
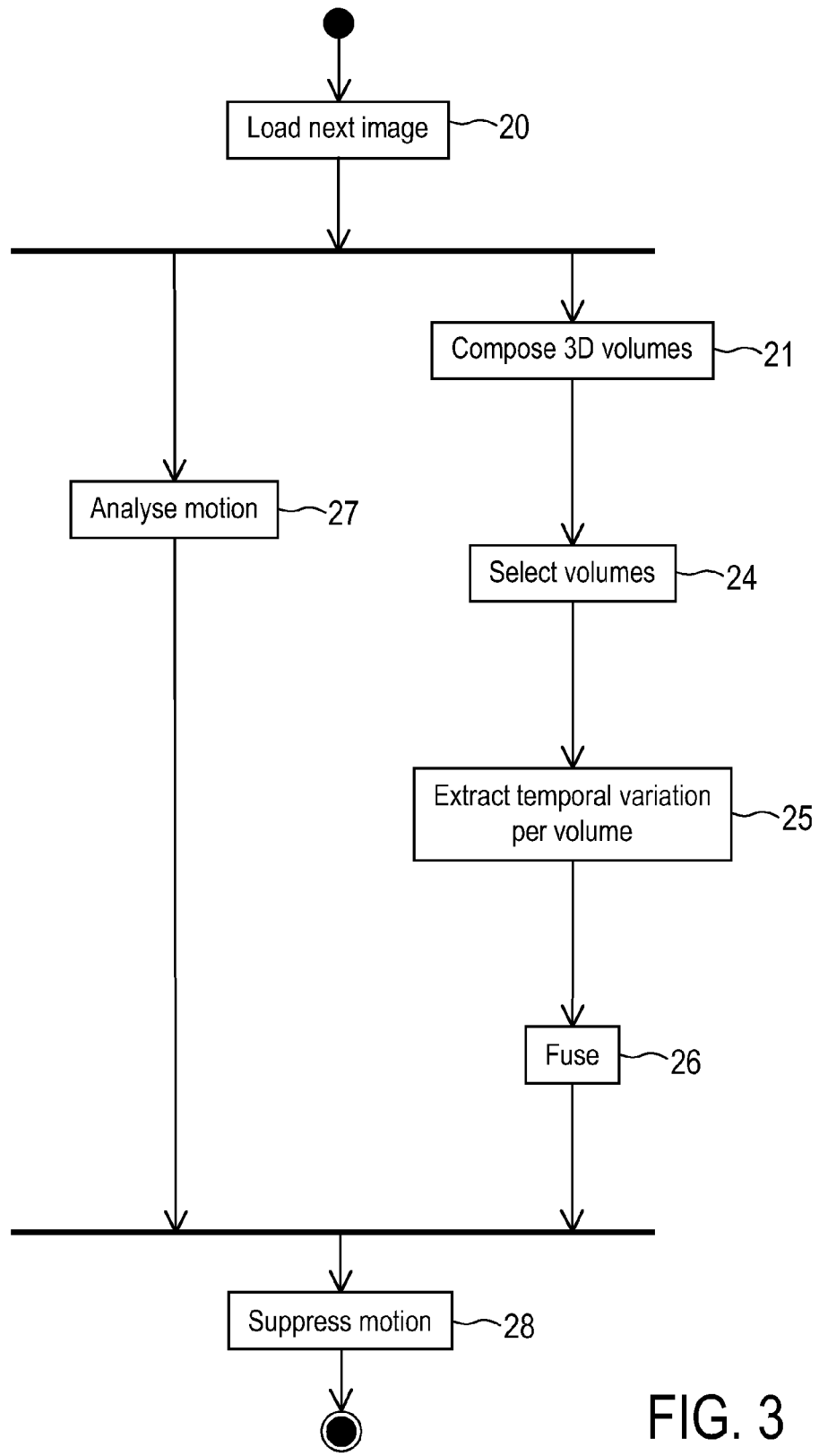
FIG. 3 is a flow chart illustrating a second embodiment of a method of forming a time-varying signal.

Generally, the same kinds of selection criteria can be used in the embodiment of FIG. 3 as have been described in connection with the selection step 14 of the embodiment of FIG. 2. Where the grid is laid over the entire image, the selection step 24 of the method of FIG. 3 will at least also include a step of evaluating whether the sub-sets of pixel values represent a surface of a certain type, e.g. exposed skin of a human being. Further selection criteria relate to the uniformity of each sub-set of pixel values and to the temporal uniformity of the sequence 23 of sub-sets. Only the most uniform spatio-temporal volumes, or those meeting some absolute uniformity criterion are kept. The calculation of the uniformity in the spatial and temporal domains can be done using any of a number of methods, including calculations of the dynamic range, variance, entropy, etc.

The step 21 of composing spatio-temporal volumes can use a default spatial aperture and time interval $\Delta t$. In one embodiment, a different size of aperture is used with each iteration of the method of FIG. 3, i.e. for each interval of the total sequence of images that is processed. Additionally or alternatively, the length of the interval, i.e. the number of images in the set 22 is varied. The aperture size (width $\Delta x$ or height $\Delta y$) can be linked to the uniformity of the analyzed area. More uniform areas would then result in larger apertures. Other suitable influencing factors include the spatial resolution of the sensors of the video camera 6 and other features of these sensors. In other embodiments, the grid is irregular, in the sense that different apertures have different dimensions. The appropriate dimensions can also be determined by carrying out at least one of object segmentation, color segmentation and background-foreground segmentation on at least one of the set 22 of images. If the segmentation yields relatively small segments, then the apertures of the grid should also be small. The appropriate size of the interval $\Delta t$ covered by the set 22 of images will generally depend on the amount of motion present in each image. Thus, some of the analysis relevant to the selection step 24 will in these embodiments already have been carried out to compose the spatio-temporal volumes. Other factors that can determine the size of the interval $\Delta t$ include the frame rate of the video camera 6, the intensity of motion of the subject represented in the images and changes of illumination.

After certain ones of the spatio-temporal volumes have been selected, the temporal variations in a value based on the pixel values of the spatio-temporal volume are extracted (step 25) for each selected spatio-temporal volume. In this step 25, pixel values from within a sub-set are combined into a single value, e.g. by taking a weighted average or by finding the mean value. This is done for each of the sub-sets in the sequence 23 (FIG. 5), so that there is one such value per image. An effect of the combination of pixel values is that the robustness to noise is relatively high. Other ways of extracting a signal value are possible, however. In an embodiment, each image comprises two or more image frames, each corresponding to a different channel and comprised of pixel values representing intensities of electromagnetic radiation captured in a limited range of the spectrum of electromagnetic radiation. For example, the sequence of images can comprise sequences of image frame in different color channels (e.g. Red, Green and Blue). In this alternative, the combination can involve taking a weighted sum of pixel values from each image frame forming a complete image. It can also involve a subtraction operation, e.g. a subtraction of the mean luminance from the pixel values in a channel corresponding to green light.

As illustrated in FIG. 5, the difference between the value calculated for one sub-set of pixel values and the temporal average of the values for all the sub-sets in the sequence 23 is calculated. In general, any other method to extract a temporal fluctuations in a spatial mean luminance of color values over a certain temporal period can be used. These variations should be in a certain range of amplitude changes and frequency values.

In the illustrated embodiment, a sliding window is used to form and select spatio-temporal volumes. Thus, at each iteration, the signal segments obtained for the current set 22 of images are fused (step 26) with each other and with overlapping signal segments obtained at preceding iterations. The fusion can be based on finding the highest correlation between signals or on illuminating outliers, for example. The signal segments can participate in the fusion operation with different weighting parameters. These can depend on the length of the time interval Δt of the associated spatio-temporal volumes (more weight being assigned to volumes with larger intervals Δt), for example.

The fused signal is used to extract the most important information, which is the heart rate in the case of heart beat signal monitoring. An alpha trend mean filter can be used to extract the part of the fused signal that is of interest from the fused signal.

As illustrated, a similar method of suppressing components representative of periodic motion as described in relation to FIG. 2 is used. That is to say, a parallel step 27 of obtaining separate data representative of at least a periodic component of motion of a living being represented in the sequence of images being processed is obtained by carrying out video-based motion analysis of the sequence of images. In the illustrated embodiment, the situation is shown in which one motion signal is obtained and used at least to suppress (step 28) a component of the fused signal corresponding to that periodic motion.

In an alternative embodiment, separate motion signals can be obtained for separate parts of the images, and used to suppress components of the signal sections obtained for spatio-temporal volumes corresponding to those parts. In a particular embodiment, whether to obtain separate motion signals for suppressing at least periodic components of signal sections extracted from separate spatio-temporal volumes is dependent on the degree of difference between the motion signals.

In order to limit the motion suppression to certain types of motion, the analysis step 27 will generally quantify the motion, e.g. by calculating motion vectors. In the latter case, the motion signal can be obtained by determining the repetitiveness of motion vectors, in order to suppress components of the fused signal, or of an extracted signal section, within a range corresponding to the repetition frequency.

Figure 6:
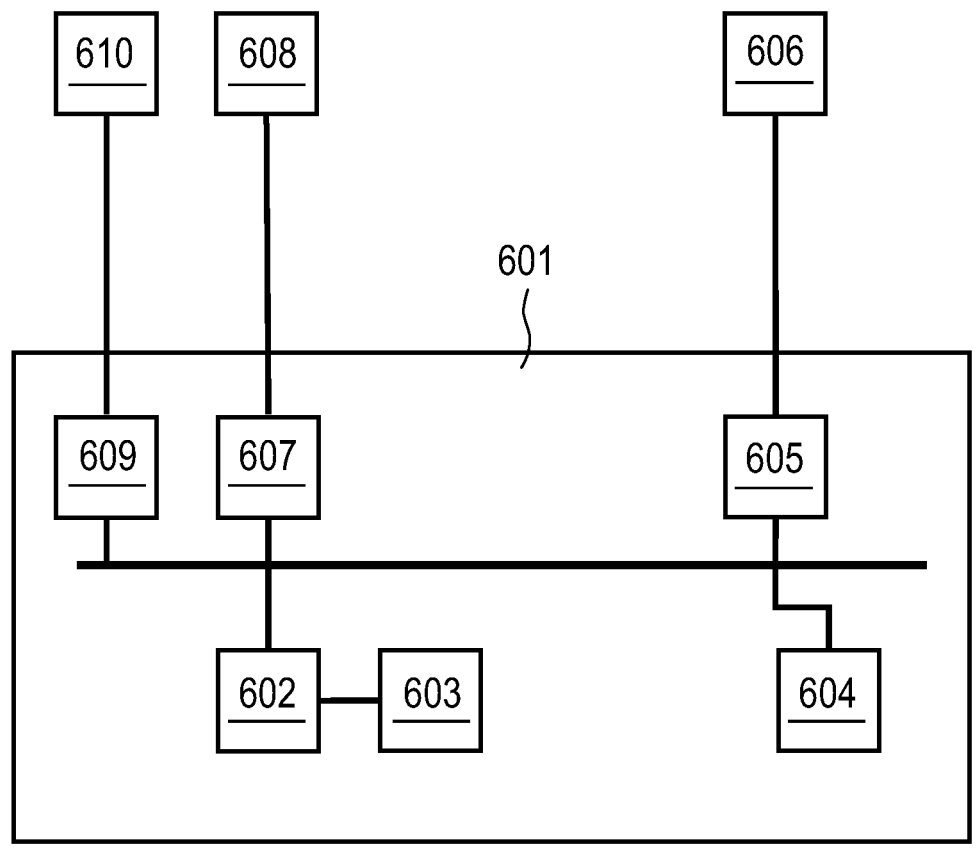
FIG. 6 is a schematic illustration of an alternative system for processing a signal including at least a component representative of a periodic phenomenon in a living being.

FIG. 6 illustrates an alternative system for implementing the principle of motion suppression underlying the methods described above. Parts of the system that correspond to the system of FIG. 1 have been given like reference numerals. The data processing system 601 of FIG. 6 differs by additionally comprising an interface 609 to at least one sensor 610 for capturing a signal representative of a periodic phenomenon in a living being.

In one embodiment, the sensor 610 is arranged to capture a signal including at least a component representative of the heart beat of a living being. In a variant, the sensor 610 is adapted to capture such a signal only upon contact with the living being. For example, the sensor 610 can comprise electrodes, arranged to be held in close proximity to a person's body in order to capture one or more electrocardiographic signals.

The data processing system 601 simultaneously receives a sequence of images from the video camera 606. Video-based analysis is carried out in order to determine a signal representative of at least a periodic component of motion of at least part of the body of the living being monitored by the sensor 610. This does not necessarily have to be the same body part as that against which the sensor 610 is held. For example, the video camera 606 can capture images of the upper body of a person on an exercise bike, with the sensor 610 being integrated in the handles of the exercise bike. Because the signal from the sensor 610 will generally be affected by the swaying of the upper body of the person exercising, it is useful to determine a signal representative of this swaying motion in order to suppress a corresponding component of the signal from the sensor 610. This is carried out by the data processing system 1 which provides information based on the corrected signal to the user via the output device 608.

In one embodiment, the data processing system calculates motion, at least one time-varying motion vector, as part of the video-based analysis. The repetitiveness of the motion vector values is then analyzed to obtain a signal representative of at least a periodic component of motion. This signal is used to correct the signal from the sensor 610.

In certain embodiments, a signal representative of at least a periodic component of certain types of motion is obtained. For example, only motion in a particular plane can be determined. Alternatively or additionally, only motion of a certain magnitude or within a certain range of frequencies can be determined.

The signal from the sensor 610 can be corrected by blocking frequencies corresponding to the periodic motion in the signal. In another embodiment, time-frequency (e.g. wavelet) analysis is carried out on both the motion signal and the signal from the sensor 610. This allows for an estimation of and compensation for non-repetitive motion, in the sense that the periodic components are analyzed separately for relatively small successive temporal windows. The size of such temporal windows can depend on different parameters, including an expected intensity of motion and a distance between the video camera 606 and the subject.

Next, a further embodiment of the present invention shall be described. A method for measuring skin color variations is based on a camera that takes images of the face and calculates the pixel average over a manually selected skin region (e.g. cheek). By looking at periodic variations of this average signal, the heart rate could be extracted in a lab setting.

The average signal obtained by the camera contains a very small signal corresponding to the heartbeat signal, and is easily polluted by the motion of the individual. If the motion of the individual is periodic, like someone running on a treadmill, and the frequency falls within the frequency range of interest, say, between 40 BPM and 210 BPM, it is difficult to distinguish the motion frequency from the heartbeat frequency. As an example, the spectrogram of the signal obtained from an individual running on a treadmill is plotted in FIG. 7.

Figure 7:
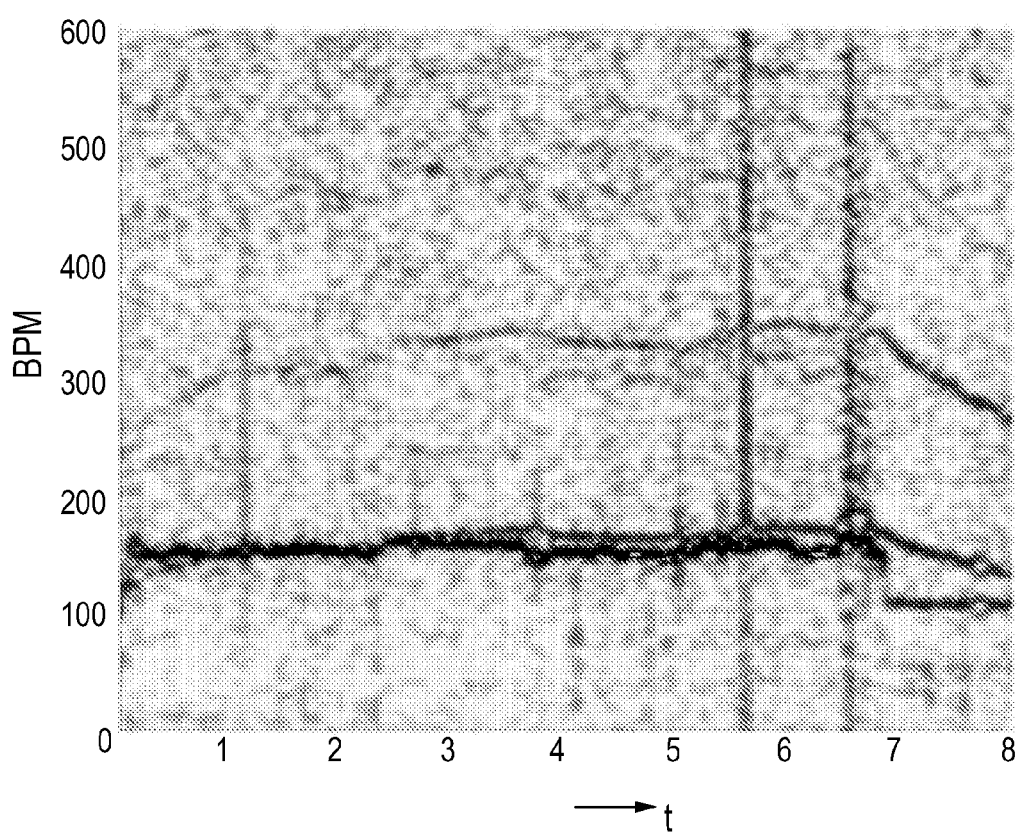
FIG. 7 is a diagram showing a spectrogram of a signal obtained from an individual running on a treadmill without motion induced disturbance cancellation.

In FIG. 7, the horizontal axis corresponds to time in minutes, while the vertical axis corresponds to the beats-per-minute (frequency). A horizontal dark line can be clearly seen around 150 BPM. The darker the line is, the larger the energy of the signal at this frequency. This dark line corresponds to the motion. In addition, three lines can be seen with a lower intensity around 150 BPM, 300 BPM and, somewhat fainter, around 450 BPM. These lines correspond to the fundamental frequency and the two harmonics of the heartbeat signal. Clearly, the motion pollutes the signal significantly, since the energy of the motion signal is large compared to the heartbeat signal. So to estimate the heart rate correctly the influence of the motion has to be reduced. In addition, if it is possible to remove the motion from the signal, a much cleaner heartbeat signal can be obtained, which enables estimating the heart rate in the time domain by peak-to-peak detection. An additional advantage of a clean signal is that the HRV (heart rate variability) can be estimated.

It has been found that the (mean) motion vectors describing the motion of the skin region of interest in time is a very clean signal and describes the motion in a precise way. Moreover, the motion vectors do not contain any heartbeat signal, and are therefore very suitable to use as reference signals (in adaptive echo cancellation terminology it is called the far-end signals), for instance for an adaptive filter (as e.g. described in B. Widrow and S. D. Stearns, *Adaptive Signal Processing*, Prentice-Hall, Inc., Englewood Cliffs, N.J. 07632, 1985, which provides for an overview of adaptive filters) to reduce the motion induced distortion in the average skin-tone signal.

Looking to the individual motion vectors of each pixel, it can be seen that these motion vectors are not all the same (e.g. if there is a rotation of the head, but with translation these vectors are more similar). Preferably, simply the mean motion vector of all the pixels (or of a group of pixels) is taken and used as the reference signal. It is also possible to divide the object, e.g. the face, into regions and use the mean motion vectors of these regions to compensate locally.

Figure 8:
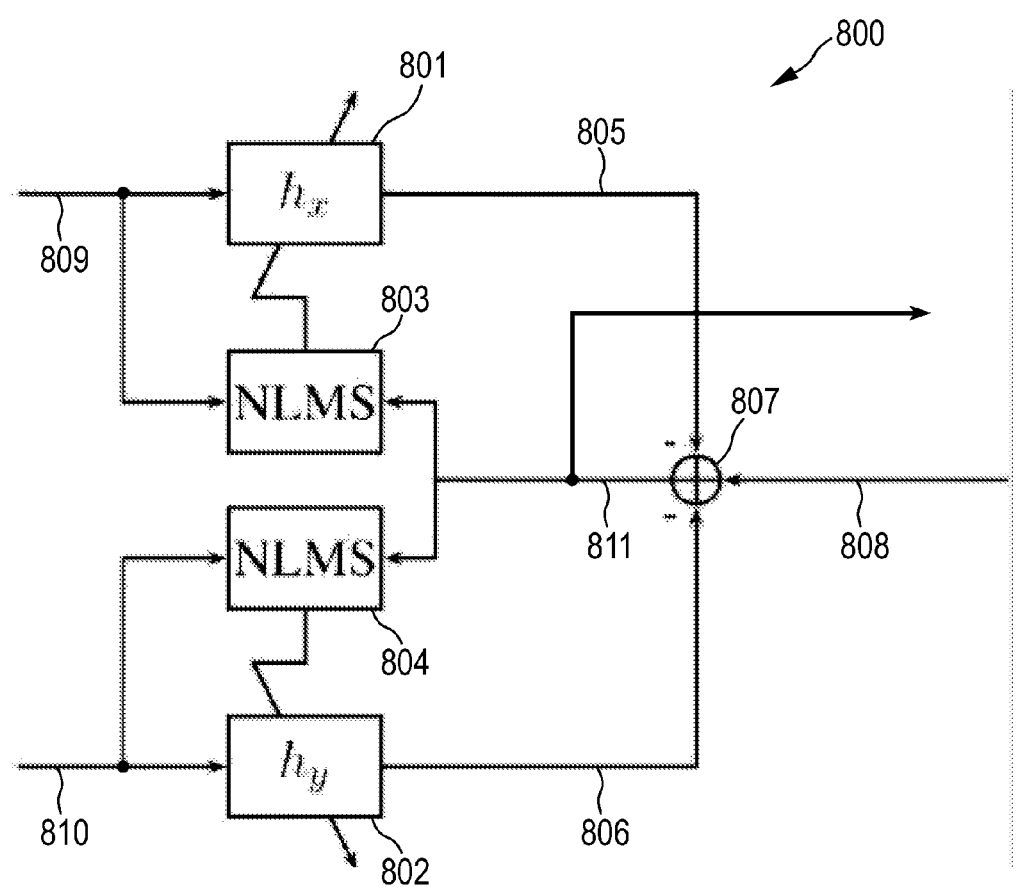
FIG. 8 is a block diagram of an embodiment of a motion compensation unit for reducing the motion induced pollution in the heartbeat signal.

FIG. 8 depicts a block diagram of an embodiment of a motion compensation unit 800 for use in the above described systems, preferably as part of the processing unit 7 or 607, in order to reduce the motion induced pollution in the heartbeat signal (in general, in the signal obtained by the processing as described above with reference to FIG. 2 or 3, in particular the output of step 17 or step 26). Said motion compensation unit 800 is thus, for instance, adapted for implementing step 19 or step 28 of said methods illustrated with reference to FIG. 2 or 3.

The motion compensation unit 800 comprises two adaptive filters 801, 802, which filter the (mean) x- and y-motion of the skin region of interest, provided as input x-motion signal 809 and input y-motion signal 810. These motion signals 809, 810 may e.g. be provided by step 18 or step 27 of the above described embodiments of the proposed method and/or may be provided by the sensor 610 shown in FIG. 6. It should be noted that the number of two filters and the use of two motion signals (for motion in x-direction and y-direction) are not mandatory. Generally, one filter and one motion signal in a desired direction (e.g. of assumed strongest motion) or more filters and more motion signals (in desired directions) can also be used.

In this embodiment, the coefficients of the adaptive filters 801, 802 are updated by means of a normalized least-mean-square (NLMS) algorithm in normalizing units 803, 804, but other adaptive algorithms can be used. The filtered x- and y-motion signals 805, 806 are subtracted in a subtraction unit 807 from the input signal 808, which corresponds to the heartbeat signal obtained by the camera polluted with a motion induced signal. The normalizing units 803, 804 adapt the coefficients such that the energy of the output signal 811 (ideally the heartbeat signal from which the motion induced pollution is removed) is minimized. Since the x- and y-motion signals 809, 810 do not contain the heartbeat signal this minimum is reached when the output signal 811 does not contain any signal correlated with the motion. Hence, according to this embodiment the adaptive filters 801, 802 preferably simply change the amplitude and the phase of the reference signals such that the distortion due to the motion is reduced.

Figure 9:
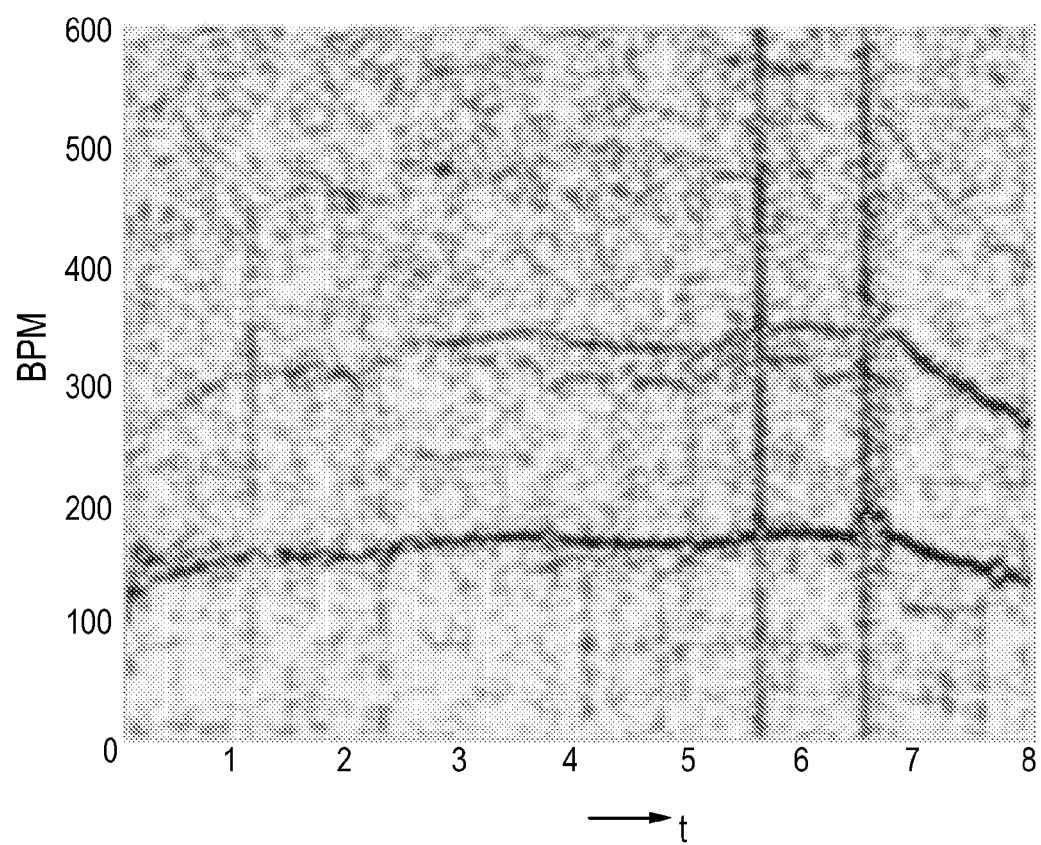
FIG. 9 is a diagram showing a spectrogram of a signal obtained from an individual running on a treadmill after motion induced disturbance cancellation.

In FIG. 9 the resulting spectrogram obtained from an individual running on a treadmill is plotted, when the mean motion vectors of the skin region of interest are used to reduce the motion induced signal in the heartbeat signal by means of the adaptive filters. Compared to the plot depicted in FIG. 7, it can be clearly seen that the motion induced pollution is removed considerably. In this case, only four coefficients for both adaptive filters 801, 802 are used.

In the above described embodiment explained with reference to FIGS. 7 to 9, it was assumed that the x- and the y-motion are completely uncorrelated and that the two normalization units 803, 804 adapt independently. In practice this is not necessarily the case, but generally a multiple-input-single-output adaptive filter as adaptive filters 801, 802 is used to take the correlation between the two input motion signals 809, 810 into account. However, if the correlation is small, the above described embodiment will work very well as the example shows. For instance, according to the present it is possible to reliably extract the heartbeat signal, which is even further improved by a reduction of the motion induced distortion. It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

The measure of similarity used to find similar sub-sets in the method of FIG. 2 can be limited to similarity of texture. Exact similarity of pixel values is not required.

The invention claimed is:

1. Method of processing a signal including at least a component representative of a periodic phenomenon in a living being, including:
   receiving a sequence of images showing the living being;
   extracting at least one first signal having at least a component representative of a periodic phenomenon in a living being from the sequence of images using remote plethysmography;
   obtaining separate data representative of at least a periodic component of motion of the living being by carrying out motion analysis of the sequence of images; and
   using the data at least to suppress a component of the first signal corresponding to the periodic component of motion of the living being, wherein the method is unobtrusive to the living being, and wherein the living being can be in motion.

2. Method according to claim 1, wherein extracting the at least one first signal from the sequence of images includes obtaining values of a variable corresponding to a combination of pixel values from a respective image.

3. Method according to claim 2, wherein extracting the at least one first signal from the sequence includes determining only variations in the variable over the sequence.

4. Method according to claim 1, including calculating at least one motion vector for at least one subject represented in the images and analyzing a repetitiveness of motion vector values.

5. Method according to claim 4, including calculating motion vector values for each of a plurality of parts of a subject represented in the images.

6. Method according to claim 1, wherein obtaining separate data representative of at least a periodic component of motion includes quantifying spatial displacements of at least part of the living being.

7. Method according to claim 1, including
calculating at least one motion vector for at least one subject represented in the images,
filtering said at least one motion vector, and
subtracting the filtered motion vector from said first signal to suppress a component of the first signal corresponding to the periodic component of motion of the living being and to obtain a disturbance reduced first signal.

8. Method according to claim 7, wherein said filtering comprises adaptive filtering, wherein the coefficients of said filtering are adaptively updated.

9. Method according to claim 8, wherein the coefficients of said filtering are updated such that the energy of the disturbance reduced first signal is minimized.

10. Method according to claim 7, wherein at least two motion vectors, in particular in a first direction and a second direction perpendicular to the first direction, are separately calculated and separately filtered.

11. Method according to claim 1, including
selecting multiple regions of interest in the sequence of images,
extracting at least one first signal having at least a component representative of a periodic phenomenon in a living being from the sequence of images using remote plethysmography for each region of interest,
obtaining separate data representative of at least a periodic component of motion of the living being for each region of interest separately, and
determining if motion of the various regions of interest differs by less or more than a predetermined amount.

12. Method according to claim 11, including using the separate data at least to suppress a component of the first signal corresponding to the periodic component of motion of the living being individually for each region of interest using the associated separate data of the associated region of interest, if motion of the various regions of interest differs by more than said predetermined amount,
or based on single separate data formed based on the separate data associated with the regions of interest, if motion of the various regions of interest differs by less than said predetermined amount.

13. System for processing a signal including at least a component representative of a periodic phenomenon in a living being, including:
an interface for receiving a sequence of images showing the living being in an unobtrusive manner,
a processing system for extracting at least one first signal having at least a component representative of a periodic phenomenon in a living being from the sequence of images using remote plethysmography; for obtaining separate data representative of at least a periodic component of motion of the living being; for carrying out motion analysis of the sequence of images; and for using the data to at least suppress a component of the first signal corresponding to the periodic component of motion of the living being, wherein the living being can be in motion.

14. A non-transitory computer readable storage medium storing a program which, when executed by a computer, causes the computer to perform a method of processing a signal including at least a component representative of a periodic phenomenon in a living being, said method comprising:
receiving a sequence of images showing the living being;
extracting at least one first signal having at least a component representative of a periodic phenomenon in a living being from the sequence of images using remote plethysmography;
obtaining separate data representative of at least a periodic component of motion of the living being by carrying out motion analysis of the sequence of images; and
using the data at least to suppress a component of the first signal corresponding to the periodic component of motion of the living being, wherein the method is unobtrusive to the living being, and wherein the living being can be in motion.

15. Method of processing a signal including at least a component representative of a periodic phenomenon in a living being, including:
extracting at least one first signal having at least a component representative of a periodic phenomenon in a living being;
obtaining separate data representative of at least a periodic component of motion of the living being, by obtaining a sequence of images showing the living being, synchronized with the at least one first signal, and carrying out motion analysis of the sequence of images;
using the data at least to suppress a component of the first signal corresponding to the periodic component of motion of the living being;
calculating at least one motion vector for at least one subject represented in the images;
filtering said at least one motion vector; and
subtracting the filtered motion vector from said first signal to suppress a component of the first signal corresponding to the periodic component of motion of the living being and to obtain a disturbance reduced first signal.

16. Method according to claim 15, wherein said filtering comprises adaptive filtering, wherein the coefficients of said filtering are adaptively updated.

17. Method according to claim 16, wherein the coefficients of said filtering are updated such that the energy of the disturbance reduced first signal is minimized.

18. Method according to claim 15, wherein at least two motion vectors, in particular in a first direction and a second direction perpendicular to the first direction, are separately calculated and separately filtered.

* * * * *